US010734622B2

(12) United States Patent
Plessner et al.

(10) Patent No.: US 10,734,622 B2
(45) Date of Patent: Aug. 4, 2020

(54) VENTILATION CONDUIT FOR AN AIRCRAFT

(71) Applicant: The Boeing Company, Chicago, IL (US)

(72) Inventors: Julie K. Plessner, Poulsbo, WA (US); Douglas D. Maben, Snohomish, WA (US); Daniel F. Lewinski, Stanwood, WA (US); George A. McEachen, Mukilteo, WA (US); Mark E. Smith, Renton, WA (US); Michael L. Trent, Everett, WA (US); Richard K. Johnson, Camano Island, WA (US)

(73) Assignee: The Boeing Company, Chicago, IL (US)

( * ) Notice: Subject to any disclaimer, the term of this patent is extended or adjusted under 35 U.S.C. 154(b) by 460 days.

(21) Appl. No.: 15/495,436

(22) Filed: Apr. 24, 2017

(65) Prior Publication Data

US 2017/0259937 A1    Sep. 14, 2017

Related U.S. Application Data

(63) Continuation-in-part of application No. 14/188,603, filed on Feb. 24, 2014, now Pat. No. 9,663,233.

(Continued)

(51) Int. Cl.
*H01M 2/12* (2006.01)
*B64C 1/00* (2006.01)
(Continued)

(52) U.S. Cl.
CPC .......... *H01M 2/1223* (2013.01); *B64C 1/00* (2013.01); *B64C 1/1453* (2013.01);
(Continued)

(58) Field of Classification Search
CPC . B64C 1/00; B64C 1/1453; B64C 2001/0072; F16L 25/026; H01M 2/1223;
(Continued)

(56) References Cited

U.S. PATENT DOCUMENTS

| 2,207,242 A | * | 7/1940 | De Seversky | ......... B64D 33/04 |
|---|---|---|---|---|
| | | | | 244/130 |
| 2,283,045 A | * | 5/1942 | Carbonara | .............. G01P 5/165 |
| | | | | 205/73 |

(Continued)

FOREIGN PATENT DOCUMENTS

| EP | 0205283 A1 | 12/1986 |
|---|---|---|
| EP | 0654402 A1 | 5/1995 |
| WO | 2011018381 A2 | 2/2011 |

*Primary Examiner* — Avinash A Savani
*Assistant Examiner* — Martha M Becton
(74) *Attorney, Agent, or Firm* — Miller, Mathias & Hull LLP (57) ABSTRACT

According to an embodiment, an aircraft comprises a fuselage including composite skin; an enclosure located inside the fuselage; a rechargeable battery disposed inside the enclosure; and a ventilation conduit extending from the enclosure to an opening in the composite skin, the ventilation conduit including: a first portion having a first end coupled to the enclosure and a second end spaced from the composite skin, and a second portion extending between the composite skin and the second end of the first portion, the second portion comprising an electrically non-conductive material.

20 Claims, 6 Drawing Sheets

Related U.S. Application Data (60) Provisional application No. 61/769,110, filed on Feb. 25, 2013.

(51) Int. Cl.
*F16L 25/02* (2006.01)
*B64C 1/14* (2006.01)
*B64D 45/00* (2006.01)
*B64D 41/00* (2006.01)

(52) U.S. Cl.
CPC ......... *F16L 25/026* (2013.01); *H01M 2/1241* (2013.01); *H01M 2/1276* (2013.01); *B64C 2001/0072* (2013.01); *B64D 41/00* (2013.01); *B64D 2045/009* (2013.01); *H01M 2200/20* (2013.01); *H01M 2220/20* (2013.01)

(58) Field of Classification Search
CPC .... H01M 2/1241; H01M 2/12; H01M 2/1276; H01M 2200/20; H01M 2220/20; B64D 2045/009; B64D 41/00
See application file for complete search history.

(56) References Cited

U.S. PATENT DOCUMENTS

| | | | |
|---|---|---|---|
| 2,393,593 A | | 1/1946 | Daiber |
| 3,210,095 A * | 10/1965 | Elliott | F16L 58/1027 285/148.19 |
| 4,468,440 A * | 8/1984 | Evjen | H01M 10/63 429/120 |
| 4,762,978 A * | 8/1988 | Tanis | H05B 3/36 219/209 |
| 5,290,996 A | | 3/1994 | Giamati et al. |
| 5,655,732 A | | 8/1997 | Frank |
| 6,007,944 A * | 12/1999 | Bechtold | H01M 2/021 429/211 |
| 6,211,494 B1 | | 4/2001 | Giamati et al. |
| 6,435,452 B1 | | 8/2002 | Jones |
| 6,779,269 B2 | | 8/2004 | Green et al. |
| 8,857,768 B2 | | 10/2014 | Giamati |
| 9,248,917 B2 * | 2/2016 | Gastonides | G08B 25/10 |
| 9,315,253 B2 | | 4/2016 | Lee et al. |
| 9,663,233 B2 | | 5/2017 | Plessner et al. |
| 2002/0014771 A1 | | 2/2002 | Gotoh |
| 2002/0056789 A1 | | 5/2002 | Jones |
| 2002/0145851 A1 | | 10/2002 | Manno et al. |
| 2005/0244705 A1 * | 11/2005 | Cherng | H01M 2/12 429/52 |
| 2006/0110656 A1 * | 5/2006 | Moores, Jr. | B25F 5/008 429/83 |
| 2008/0041084 A1 | | 2/2008 | Minami |
| 2010/0044514 A1 * | 2/2010 | Tacke | B64C 1/069 244/131 |
| 2010/0136404 A1 * | 6/2010 | Hermann | H01M 2/1016 429/120 |
| 2010/0136409 A1 * | 6/2010 | Straubel | H01M 2/0267 429/129 |
| 2010/0293959 A1 * | 11/2010 | Remy | F02C 3/30 60/773 |
| 2011/0159340 A1 * | 6/2011 | Hu | H01M 2/1077 429/120 |
| 2012/0074617 A1 * | 3/2012 | Eckel | C08L 69/00 264/320 |
| 2012/0169287 A1 * | 7/2012 | Lopin | H02J 7/0057 320/127 |
| 2012/0231306 A1 | | 9/2012 | Herron et al. |
| 2013/0032219 A1 * | 2/2013 | Heim | H01M 2/1241 137/14 |
| 2013/0149582 A1 * | 6/2013 | Kimura | H01M 10/625 429/120 |
| 2013/0181445 A1 | | 7/2013 | Glime et al. |
| 2014/0242420 A1 * | 8/2014 | Schaffner | H01M 10/486 429/9 |
| 2014/0242423 A1 * | 8/2014 | Jones | H01M 2/1241 429/50 |
| 2014/0242424 A1 | | 8/2014 | Jones |
| 2014/0242896 A1 * | 8/2014 | Plessner | B64C 1/1453 454/71 |
| 2014/0272479 A1 | | 9/2014 | Turbe et al. |
| 2015/0069068 A1 * | 3/2015 | Hariram | A62C 3/16 220/560.01 |
| 2015/0090360 A1 | | 4/2015 | Carlay, II |
| 2015/0207118 A1 * | 7/2015 | Guen | H01M 2/345 429/54 |
| 2015/0325827 A1 * | 11/2015 | Dittmar | H01M 2/1252 137/15.01 |
| 2015/0340673 A1 * | 11/2015 | Joswig | H01M 2/1072 429/56 |
| 2016/0195437 A1 * | 7/2016 | Georgeson | G01K 11/12 374/162 |
| 2019/0162340 A1 * | 5/2019 | Harmuth | F16L 25/025 |

\* cited by examiner

VENTILATION CONDUIT FOR AN AIRCRAFT

This application is a continuation-in-part of U.S. patent application Ser. No. 14/188,603, filed on Feb. 24, 2014, which in turn claims the benefit of provisional application U.S. Ser. No. 61/769,110 filed 25 Feb. 2013, both of which are incorporated herein by reference.

BACKGROUND

Lithium-ion batteries (LIBs) are desirable for mobile computing devices, certain automobiles, and certain aircraft. They have lower weight and higher energy density than rechargeable batteries such as nickel metal hydride and nickel cadmium batteries. They have no memory degradation.

However, certain lithium-ion batteries have longstanding issues with failure events that result in the generation of hot gas. One solution is to vent the gas. While this solution might seem straightforward for rechargeable battery applications in a mobile device or an automobile, it is not straightforward for an aircraft having composite skin.

SUMMARY

According to an embodiment, an aircraft comprises a fuselage including composite skin; an enclosure located inside the fuselage; a rechargeable battery disposed inside the enclosure; and a ventilation conduit extending from the enclosure to an opening in the composite skin, the ventilation conduit including: a first portion having a first end coupled to the enclosure and a second end spaced from the composite skin, and a second portion extending between the composite skin and the second end of the first portion, the second portion comprising an electrically non-conductive material.

According to another embodiment, an aircraft comprises a fuselage including composite skin; an enclosure located inside the fuselage; a rechargeable battery disposed inside the enclosure; a ventilation conduit extending from the enclosure to an opening in the composite skin, the ventilation conduit including: a first portion having a first end coupled to the enclosure and a second end spaced from the composite skin, the first portion being formed of an electrically non-conductive material; a second portion extending between the composite skin and the second end of the first portion, the second portion being formed of an electrically non-conductive material; and a flange fitting attached to the second portion of the ventilation conduit, the flange fitting having a portion that extends into the opening in the composite skin; and a thermal spacer located between the flange fitting and the composite skin.

According to another embodiment, an aircraft comprises a fuselage including composite skin; a fairing on an exterior surface of the composite skin; an enclosure located inside the fuselage; a rechargeable battery disposed inside the enclosure; a ventilation conduit extending from the enclosure to an opening in the composite skin, the ventilation conduit including: a first portion having a first end coupled to the enclosure and a second end spaced from the composite skin, the first portion being formed of an electrically non-conductive material; a second portion extending between the composite skin and the second end of the first portion, the second portion being formed of an electrically non-conductive material; and a flange fitting attached to the second portion of the ventilation conduit, the flange fitting having a portion that extends into the opening in the composite skin; a thermal spacer located between the flange fitting and the composite skin; a second conduit that penetrates the fairing; and a flexible hose that connects the second conduit to the second portion at the composite skin.

These features and functions may be achieved independently in various embodiments or may be combined in other embodiments. Further details of the embodiments can be seen with reference to the following description and drawings.

DETAILED DESCRIPTION

Figure 1:
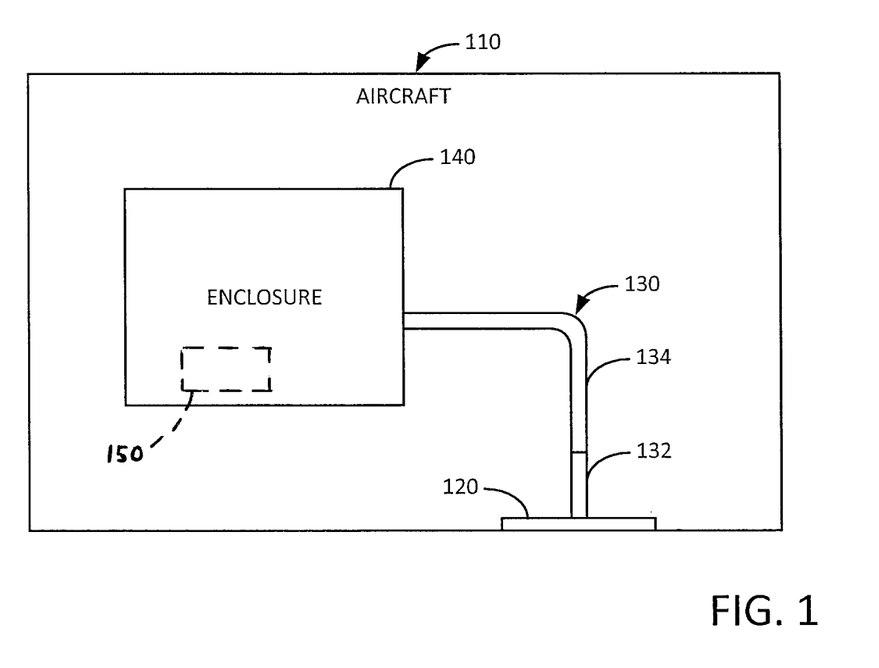
FIG. 1 is an illustration of an aircraft including an enclosure and a ventilation conduit for the enclosure.

Reference is made to FIG. 1, which illustrates an aircraft 110. The aircraft 110 includes a fuselage, wing assemblies, and empennage (not shown). Each of these major components includes skin supported by a stiffening substructure (e.g., frames, stiffeners). At least one of the fuselage, wing assemblies and empennage includes composite skin 120. In some embodiments, the composite skin 120 may include a fiber-reinforced material such as carbon fiber reinforced plastic (CFRP).

The composite skin 120 has an exterior surface that is aerodynamically smooth. The exterior surface of the composite skin 120 may be covered with a glass epoxy surface layer and paint system. Some portions of the exterior surface of the composite skin 120 may be covered by a fairing having an exterior surface that is aerodynamically smooth.

The aircraft 110 further includes a ventilation system including a ventilation conduit 130. The conduit 130 has a second or end portion 132 that extends to an opening in the composite skin 120. The second portion 132 of the ventilation conduit 130 is secured to the composite skin 120. The ventilation conduit 130 may be made entirely of metal, except for the second portion 132, which functions as an electrical insulator. Alternatively, the ventilation conduit 130 may be made entirely of a non-conductive material.

For example, a first portion 134 of the ventilation conduit 130 may be made of a lightweight, corrosion-resistant metal, such as titanium or corrosion resistant steel (CRES). Alternatively, the first portion 134, as well as the second portion 132, may be made of an electrically non-conductive material that satisfies thermal requirements of the ventilation system.

The ventilation conduit 130 overcomes a problem that is particular to the aircraft 110. The second portion 132 provides protection against lightning strike current or other current due to electromagnetic effect (EME). Because at least the second portion 132 is non-conductive, it prevents electrical current from entering inside the aircraft 110.

Figure 2A:
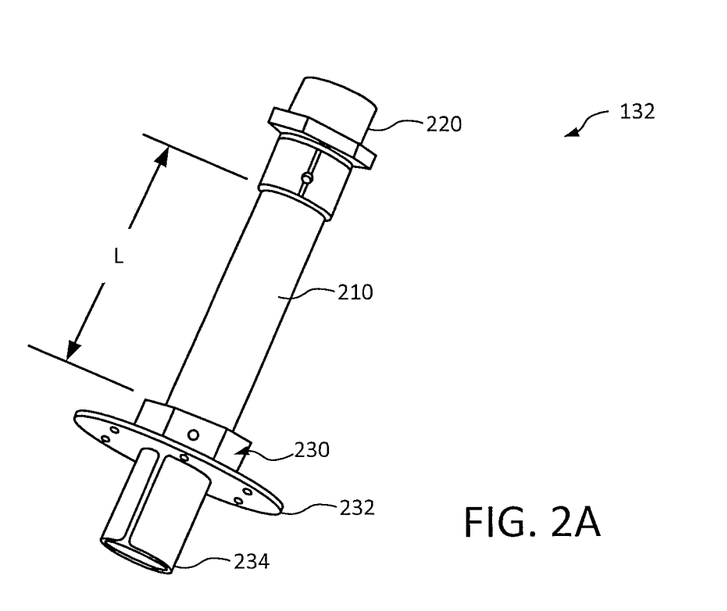
FIG. 2A is an illustration of a second or end portion of a ventilation conduit.

FIG. 2A illustrates an example of the second portion 132 of the ventilation conduit 130. The second portion 132 includes a tube 210, and a connector fitting 220 secured (e.g., bonded and riveted) to one end of the tube 210. The connector fitting 220 has internal threads for engaging threads on the first portion 134 of the ventilation conduit 130.

The second portion 132 also includes a flange fitting 230 secured (e.g., bonded and riveted) to the other end of the tube 210. The flange fitting 230 is configured to mount the tube 210 to the composite skin 120. The flange fitting 230 may include a flange 232 and a tubular portion 234 that extends beyond the flange 232. This tubular portion 234 extends into the opening in the composite skin 120.

The tube 210 is made of an electrically non-conductive material. Examples of the electrically non-conductive material include thermoplastic, and a composite with fiberglass, aramid or other nonconductive fiber. Length (L) of the tube 210 may be at least two inches to provide adequate electrical isolation against lightning strike or other electrical current.

The first portion 134, connector fitting 220, and the flange fitting 230 may also be made of an electrically non-conductive material.

Figure 3:
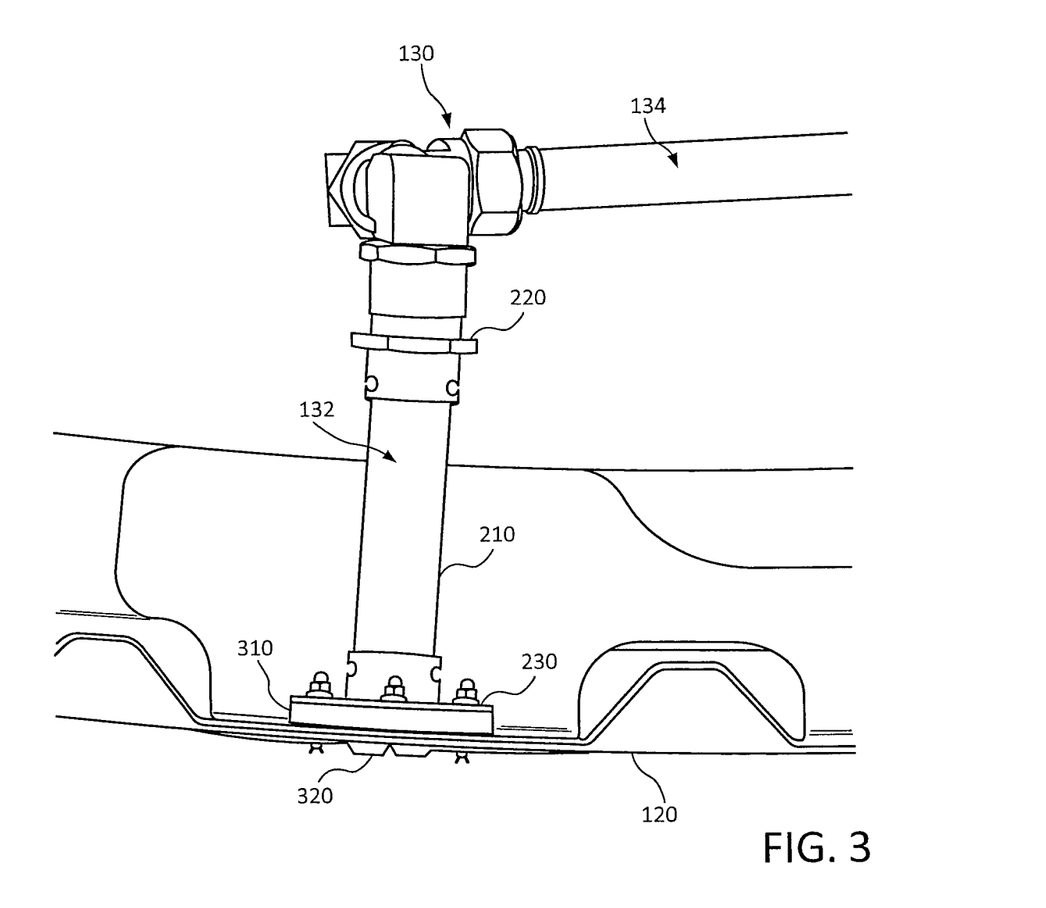
FIG. 3 is an illustration of a ventilation conduit.

Reference is now made to FIG. 3, which illustrates an example of a ventilation conduit 130 having a first portion 134 and an second portion 132. The second portion 132 of the ventilation conduit 130 includes the tube 210, the connector fitting 220, and the flange fitting 230. The first portion 134 of the ventilation conduit 130 is threaded onto the connector fitting 220, and the flange fitting 230 is fastened to composite skin 120. The tubular portion (not visible in FIG. 3) of the flange fitting 230 extends through an opening in the composite skin 120.

In some embodiments, a thermal spacer 310 may be located between the flange 232 and the composite skin 120 and also in the opening of the composite skin 120 to create a thermal barrier between the second portion 132 and the composite skin 120. The thermal spacer 310 mitigates heat transfer directly to the composite skin 120 and thereby prevents hot gases from damaging the composite skin 120 as the gases are being vented overboard the aircraft 110.

Figure 2B:
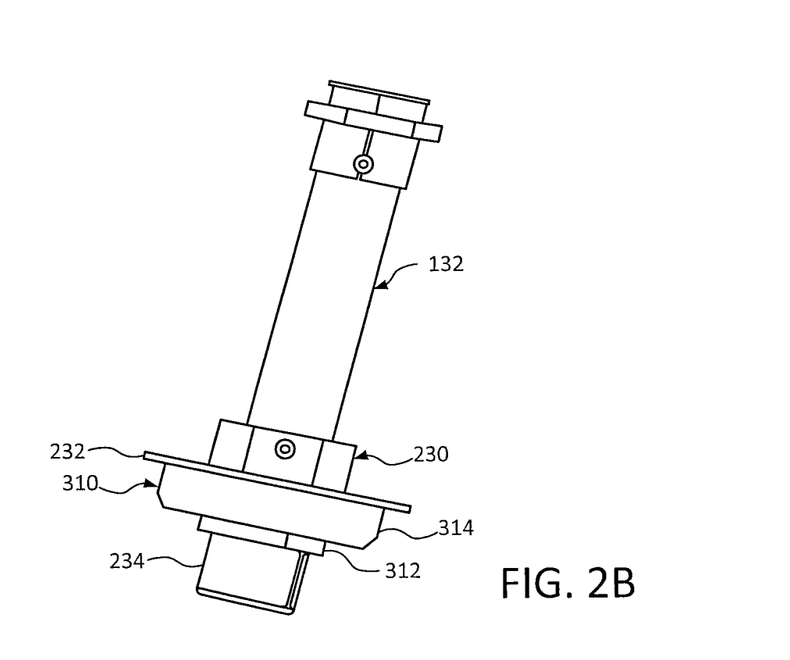
FIG. 2B is an illustration of a second or end portion of a ventilation conduit and a thermal spacer mounted to the second portion.

Additional reference is made to FIG. 2B, which illustrates the thermal spacer 310 mounted to the flange fitting 230 of the second portion 132. The thermal spacer 310 includes a first portion 312 that is configured to fit into the opening and also to surround the tubular portion 234 of the flange fitting 230. The thermal spacer 310 includes a larger second portion 314 that is configured to sit between the flange 232 and the composite skin 120. The thermal spacer 310 may be made of Polyether ether ketone (PEEK) thermoplastic or other thermoplastic or composite that meets the thermal requirements of the ventilation system.

Figure 4:
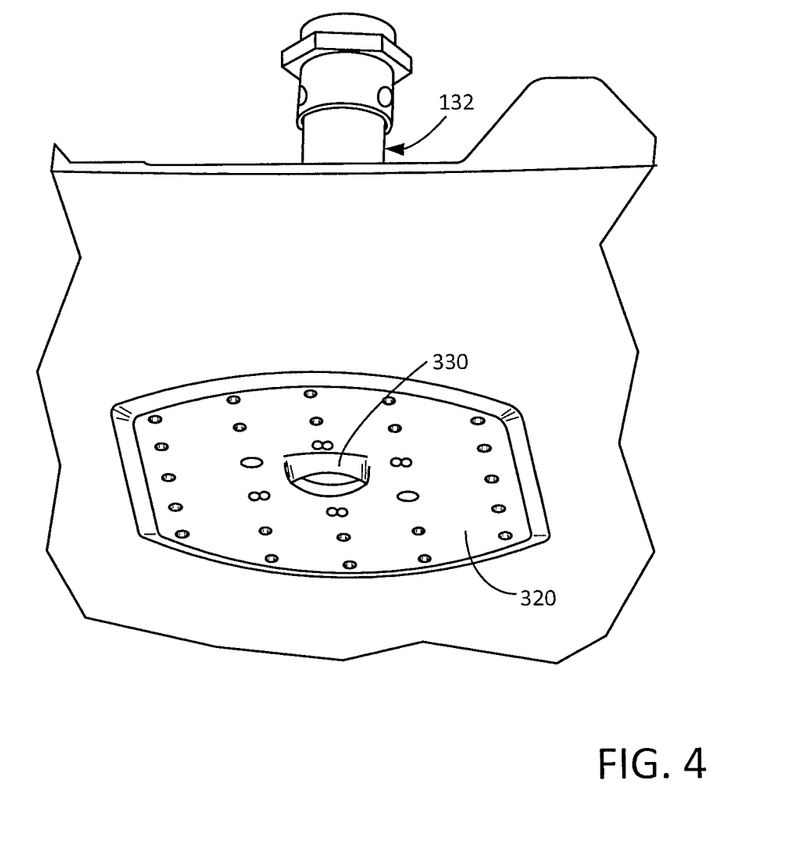
FIG. 4 is an illustration of a doubler plate for a ventilation conduit.

Additional reference is made to FIG. 4. In some embodiments, a doubler plate 320 may be mounted to the exterior surface of the composite skin 120. The doubler plate 320 may be fastened to the flange fitting 230 (as shown in FIG. 3). An opening in the doubler plate 320 receives the tubular portion 234 of the flange fitting 230. The doubler plate 320 provides structural reinforcement about the opening in the composite skin 120, and it protects the composite skin 120 against possible thermal damage from gas exiting the ventilation conduit 130. The doubler plate 320 may be made of a material such as titanium or corrosion resistant steel.

The doubler plate 320 may have a slight protrusion 330 around the opening in the skin 120 around the tubular portion 234 of the flange fitting 230 to mitigate noise. The protrusion 330 is sufficient to reduce noise of airstream passing over the opening in the composite skin 120 during flight.

Returning to FIG. 1, the ventilation conduit 130 is not limited to any particular ventilation system aboard the aircraft 110. In general, the ventilation system allows gas to be vented from an enclosure 140 (via the ventilation conduit 130) and exhausted overboard the aircraft 110. One example of the enclosure 140 is a fuel tank. Another example of the enclosure 140 is a metal enclosure for a rechargeable battery 150.

Figure 5:
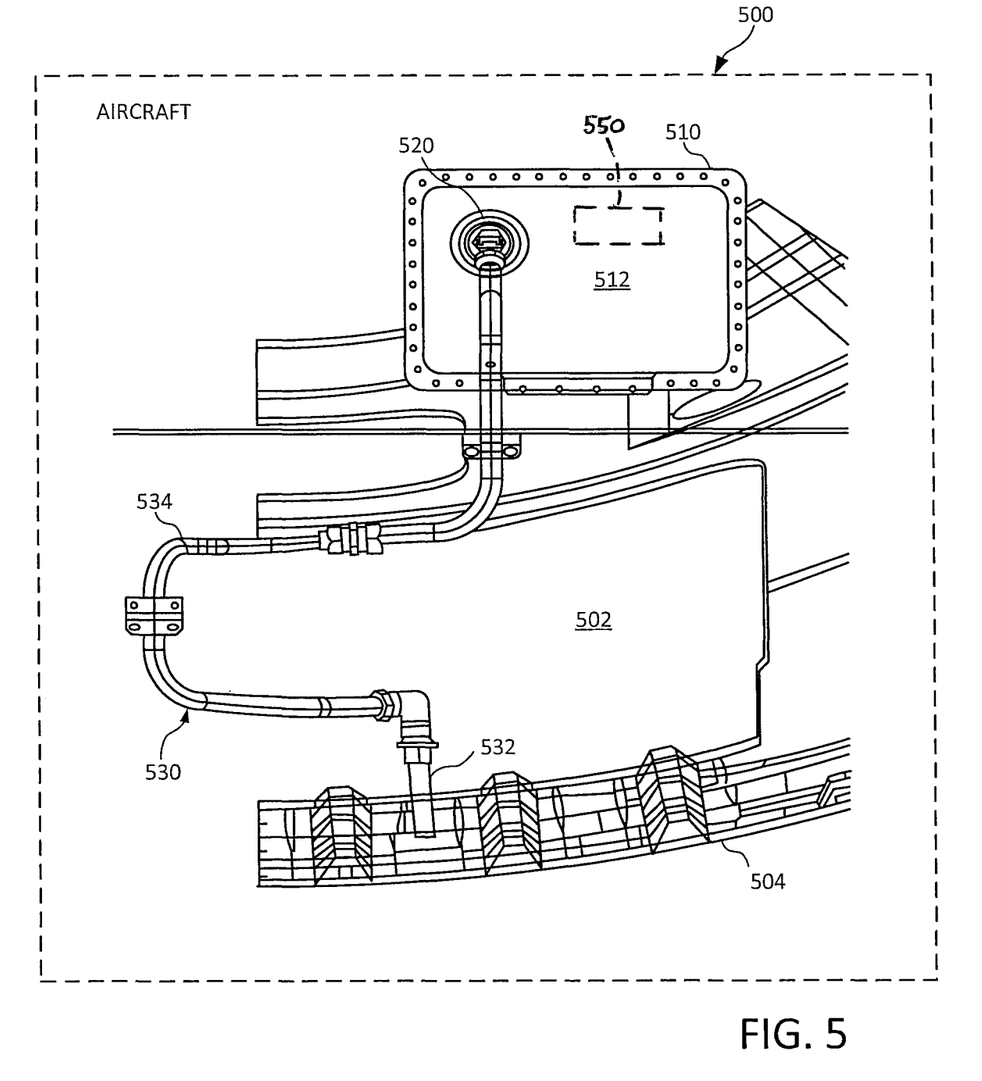
FIG. 5 is an illustration of a ventilation system for a rechargeable battery of an aircraft.

Reference is made to FIG. 5, which illustrates an enclosure 510 for a rechargeable battery 550 aboard an aircraft 500. The enclosure 510 may be located in the fuselage 502 of the aircraft 500.

If a battery failure event occurs, the battery may generate hot gas. The enclosure 510 contains the gas.

FIG. 5 also illustrates a ventilation system for the enclosure 510. The ventilation system includes a ventilation conduit 530 and a vent valve 520. The vent valve 520 is located at an opening in a wall 512 of the enclosure 510. The ventilation conduit 530 extends from the vent valve 520 to composite skin 504 of the fuselage 502. The vent valve 520 is normally closed to prevent the battery environment inside the enclosure 510 from cycling with ambient airplane pressures between takeoff and cruise altitudes (e.g., sea level and 40,000 feet). Such cycling can decrease the life of the battery.

A first portion 534 of the ventilation conduit 530 has a first end attached to the vent valve 520. A second portion 532 of the ventilation conduit 530 is coupled between the first portion 534 and the composite skin 504 of the fuselage 502. The second portion 532 of FIG. 5 may have the same or similar construction as the second portion 132 of FIG. 2.

If a battery failure event generates hot gas that causes pressure within the enclosure 510 to exceed a design limit, the vent valve 520 opens, and the hot gas is vented out of the enclosure 510, through the ventilation conduit 530, and exhausted overboard the aircraft 500.

In some embodiments, the vent valve 520 may be actively sensed and controlled (e.g., with a pressure sensor, ball valve, and actuator). In other embodiments, the vent valve 520 may be a passive valve (e.g., a spring loaded poppet valve, rupturable diaphragm).

Figure 6:
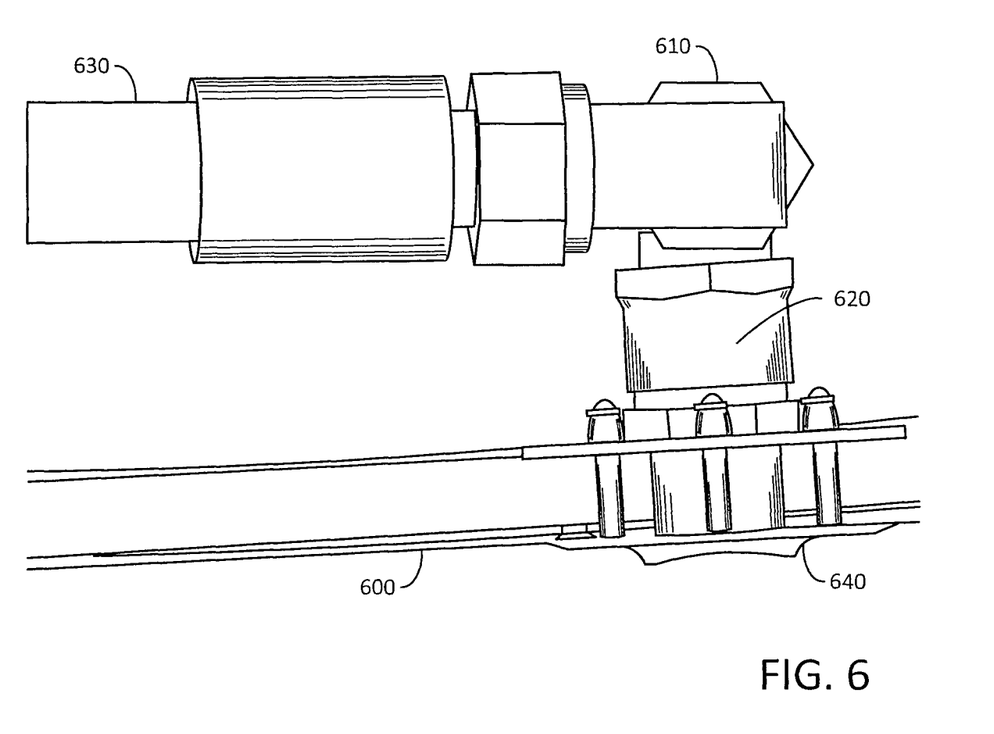
FIG. 6 is an illustration of an extension of a ventilation conduit between skin and a fairing of an aircraft.

Reference is now made to FIG. 6, which illustrates a fairing 600 on an exterior surface of the composite skin (not shown in FIG. 6). A ventilation conduit includes the second portion 132 of FIG. 2 (not shown in FIG. 6), which penetrates the composite skin.

FIG. 6 also illustrates an extension 610 of the ventilation conduit between the composite skin and the fairing 600. The extension 610 may include a second conduit 620 that penetrates the fairing 600. The second conduit 620 may be electrically conductive or non-conductive. A flexible hose 630 connects the second conduit 620 to the second portion at the composite skin. The flexible hose 630 supports flexure of the second conduit 620. A doubler plate 640 may be attached to the exterior surface of the fairing 600 over the second conduit 620.

Figure 7:
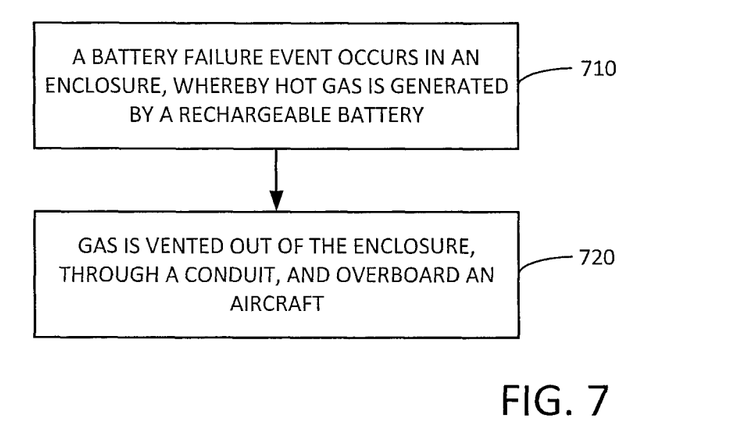
FIG. 7 is an illustration of a method of mitigating consequences of a battery failure event aboard an aircraft.

Reference is now made to FIG. 7, which a method of using the ventilation system to mitigate the consequences of a battery failure event aboard an aircraft having a rechargeable battery within an enclosure. At block 710, a battery failure event occurs, whereby hot gas is generated by the battery. The hot gas causes pressure in the enclosure to rise.

At block 720, the pressure causes the vent valve to open. Gas is vented out of the enclosure, through the ventilation conduit, and overboard the aircraft. The thermal spacer and the doubler plate prevent the hot gas from damaging the composite aircraft skin. As gas in the enclosure is being vented, pressure within the enclosure is reduced.

If, during flight, lightning current or other current attaches to the doubler plate, the second portion of the ventilation conduit will prevent the current from entering into the aircraft.

The invention claimed is:

1. An aircraft comprising:
a fuselage including composite skin;
an enclosure located inside the fuselage;
a rechargeable battery disposed inside the enclosure;
a vent valve coupled to a wall of the enclosure, the vent valve having a normally closed position at least between a takeoff altitude and a cruise altitude of the aircraft, wherein the vent valve is configured to automatically move to an open position in response to a battery failure event; and
a ventilation conduit extending from the vent valve to an opening in the composite skin, the ventilation conduit including:
a first portion having a first end coupled to the enclosure and a second end spaced from the composite skin, and
a second portion extending between the composite skin and the second end of the first portion, the second portion comprising an electrically non-conductive material.

2. The aircraft of claim 1, in which the first portion comprises an electrically non-conductive material.

3. The aircraft of claim 2, in which the electrically non-conductive material of the first portion includes one of a thermoplastic, a fiberglass composite, and an aramid fiber.

4. The aircraft of claim 3, in which the electrically non-conductive material of the second portion includes one of a thermoplastic, a fiberglass composite, and an aramid fiber.

5. The aircraft of claim 1, in which the second portion comprises a connector fitting configured to be secured to the second end of the first portion.

6. The aircraft of claim 1, in which the second portion of the ventilation conduit includes a tube made of an electrically non-conductive material.

7. The aircraft of claim 1, in which the composite skin is made of a carbon fiber-reinforced plastic (CFRP).

8. The aircraft of claim 1, further comprising a thermal spacer; wherein the second portion further includes a flange fitting having a portion that extends into the opening; and wherein the thermal spacer is located between the flange fitting and the composite skin.

9. The aircraft of claim 1, further comprising a doubler plate on an exterior surface of the composite skin, over the opening in the composite skin.

10. The aircraft of claim 9, in which the doubler plate has a protrusion around the opening in the composite skin.

11. The aircraft of claim 1, further comprising:
a fairing on an exterior surface of the composite skin;
a second conduit that penetrates the fairing; and
a flexible hose that connects the second conduit to the second portion at the composite skin.

12. An aircraft comprising:
a fuselage including composite skin;
an enclosure located inside the fuselage;
a rechargeable battery disposed inside the enclosure;
a vent valve coupled to a wall of the enclosure, the vent valve having a normally closed position at least between a takeoff altitude and a cruise altitude of the aircraft, wherein the vent valve is configured to automatically move to an open position in response to a battery failure event;
a ventilation conduit extending from the vent valve to an opening in the composite skin, the ventilation conduit including:
a first portion having a first end coupled to the enclosure and a second end spaced from the composite skin, the first portion being formed of an electrically non-conductive material;
a second portion extending between the composite skin and the second end of the first portion, the second portion being formed of an electrically non-conductive material; and
a flange fitting attached to the second portion of the ventilation conduit, the flange fitting having a portion that extends into the opening in the composite skin; and
a thermal spacer located between the flange fitting and the composite skin.

13. The aircraft of claim 12, in which the electrically non-conductive material of each of the first portion and the second portion includes one of a thermoplastic, a fiberglass composite, and an aramid fiber.

14. The aircraft of claim 12, further comprising a doubler plate on an exterior surface of the composite skin, over the opening in the composite skin.

15. The aircraft of claim 12, further comprising a normally closed vent valve that couples the first portion of the ventilation conduit to the enclosure.

16. The aircraft of claim 12, in which the second portion includes an electrically non-conductive tube having a first end coupled to the second end of the first portion.

17. An aircraft comprising:
a fuselage including composite skin;
a fairing on an exterior surface of the composite skin;
an enclosure located inside the fuselage;
a rechargeable battery disposed inside the enclosure;
a vent valve coupled to a wall of the enclosure, the vent valve having a normally closed position at least between a takeoff altitude and a cruise altitude of the aircraft, wherein the vent valve is configured to automatically move to an open position in response to a battery failure event;
a ventilation conduit extending from the vent valve to an opening in the composite skin, the ventilation conduit including:
a first portion having a first end coupled to the enclosure and a second end spaced from the composite skin, the first portion being formed of an electrically non-conductive material;
a second portion extending between the composite skin and the second end of the first portion, the second portion being formed of an electrically non-conductive material; and
a flange fitting attached to the second portion of the ventilation conduit, the flange fitting having a portion that extends into the opening in the composite skin;
a thermal spacer located between the flange fitting and the composite skin;
a second conduit that penetrates the fairing; and
a flexible hose that connects the second conduit to the second portion at the composite skin.

18. The aircraft of claim 17, in which the electrically non-conductive material of each of the first portion and the second portion includes one of a thermoplastic, a fiberglass composite, and an aramid fiber.

19. The aircraft of claim 18, further comprising a doubler plate on an exterior surface of the composite skin, over the opening in the composite skin, wherein the doubler plate has a protrusion extending around the opening in the composite skin.

20. The aircraft of claim 17, in which the composite skin is made of a carbon fiber-reinforced plastic (CFRP).

* * * * *